United States Patent
Guzik et al.

(10) Patent No.: US 6,362,856 B1
(45) Date of Patent: Mar. 26, 2002

(54) PLAY TO AIR CONTROL WORKSTATION SYSTEM IN A DISTRIBUTED OBJECT TELEVISION BROADCAST STUDIO

(75) Inventors: Kenneth J. Guzik, Santa Clara; Animesh Chatterjee, Sunnyvale; Thomas W. R. Jacobs, Cupertino, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/884,839

(22) Filed: Jun. 30, 1997

(51) Int. Cl.[7] .............................................. H04N 5/2226
(52) U.S. Cl. ...................... 348/722; 348/552; 348/714; 725/146; 725/148; 725/92; 725/93
(58) Field of Search ................................. 348/722, 552, 348/723, 715, 714, 716; 725/64, 67, 87, 91, 92, 93, 98, 148, 146; 709/201; 345/327; H04N 5/522, 7/14, 7/173

(56) References Cited

U.S. PATENT DOCUMENTS 5,845,279 A * 12/1998 Garofalakis et al. ........... 707/7
5,880,792 A * 3/1999 Ward et al. .................. 348/722
5,963,202 A * 10/1999 Polish .......................... 345/327
5,977,964 A * 11/1999 Williams et al. ............. 345/327
6,046,780 A * 4/2000 Tani ............................. 348/722
6,160,988 A * 12/2000 Shroyer ....................... 455/3.2

* cited by examiner

Primary Examiner—Michael Lee
Assistant Examiner—Jean W. Désir
(74) Attorney, Agent, or Firm—Conley, Rose & Tayon, PC; B. Noël Kivlin

(57) ABSTRACT

A play to air controller station system in a distributed object television broadcast studio. In one embodiment, a play to air control workstation is used to control a variety of resources in a broadcast studio system interconnected by a communications network. The resources of the broadcast studio system include a transmitter unit, various media source devices such as tape decks and file servers, a network routers unit, and various decoders and encoders. The broadcast studio system is managed as a network distributed object system where an all physical devices are attached to the network either by containing appropriate software within themselves, or by attaching themselves to a computer proxy that is on the network and is able to control their functionality. The control system includes one or more device objects configured to store, route and transmit selected video segments to be aired from the television broadcast studio.

28 Claims, 20 Drawing Sheets studioFactory->Get(...) // Studio Object Creation

Fig. 8

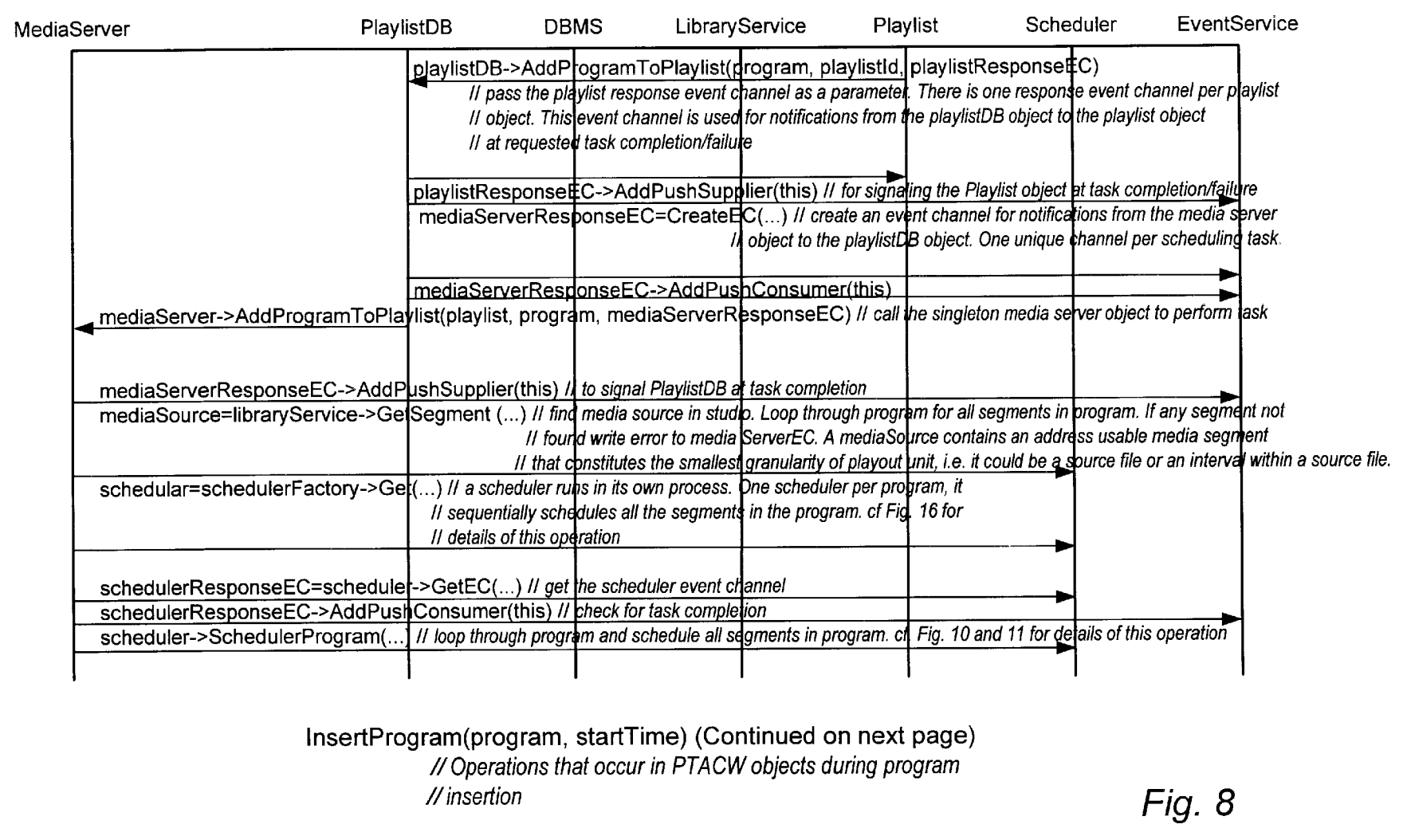

InsertProgram(program, startTime) (Continued on next page)
// Operations that occur in PTACW objects during program
// insertion InsertProgram(program, startTime) (Continued from previous page)
// Operations that occur in PTACW objects during program
// insertion ScheduleProgram(...) (Continued on next page)
// Operations that occur between PTACW objects
// during scheduling a program ScheduleProgram(...) (Continued from previous page)
// Operations that occur between PTACW objects
// during scheduling a program Segment Playout Operations (Continued on next page)
// Operations that occur at PTACW objects
// during segment playout

| Player | ScheduleTable | Connector | Stream | PTAS-1...PTAS-N, Trans.-1..... | NamingService |
|---|---|---|---|---|---|
| | | success=device1->Access(...) // obtain exclusive access to the device | | | |
| | | stream1=device->CreateStream(device2) // create the stream between source and destination on first hop | | | |
| | // create stream objects for each hop along the data path from | | | | |
| | // source to destination | | | | |
| | | success=deviceN-1Access(...) // obtain exclusive access to the device | | | |
| | | streamN-1=deviceN-1->CreateStream(deviceN) // create the stream between source and destination on last | | | |
| | | | result=stream1->PlayAt(playoutTime, ...) // playout stream at playoutTime | | |
| | // playout streams, result=SUCCESS only for streams attached | | | | |
| | // to active devices. Empty method for passive devices returns | | | | |
| | // result=PASSIVE_DEVICE | | | | |
| | | | result=streamN-1->PlayAt(playoutTime, ...) // playout stream at playoutTime | | |
| | | | result=stream1->StopAt(stopTime, ...) // stop stream at stopTime | | |
| | // stop playout of streams result=SUCCESS only for streams | | | | |
| | // attached to active devices. Empty method for passive devices | | | | |
| | // returns result=PASSIVE_DEVICE | | | | |
| | | | result=streamN-1->StopAt(stopTime, ...) // stop stream at stopTime | | |
| | | success=device1->Release(...) // release access to the device | | | |
| | // first release access to the studio devices since these devices are | | | | |
| | // along the time critical data path. | | | | |
| | | success=deviceN->Release(...) // release access to the device | | | |

Segment Playout Operations (Continued on next page)
// Operations that occur at PTACW objects
// during segment playout

Fig. 13

| Player | ScheduleTable | Connector | Stream | PTAS-1...PTAS-N, Trans.-1...... | NamingService |
|---|---|---|---|---|---|
| | | | device1->CloseStream(...) // close the stream between source and destination on first hop | | |
| | | | ... | | |
| | | | deviceN->CloseStream(...) // close the stream between source and destination on last hop | | |

// destroy stream objects for each hop along the data path from
// source to destination // need to accurately compute the time at which the playout commands should be issued. The playoutTime is obtained from
// the schedule as entered in the schedule table. A schedule in the schedule table is a list (for the case of one schedule to
// be serviced at that time) // list of lists (for the case of multiple schedules that need to be serviced at that schedule time).
// Each list consists of the devices along the data path and the schedule time for stream creation and playout at each
// of these devices. These times are determined at the time the task is scheduled by computing the various device/network
// latencies along the data path, the software latencies inherent in the object environment as well as the latencies for
// stream creation that would occur at the device. These lists are sorted by time.

// A local cache of a pool of objects for each device type will be maintained to reduce the software overheads of locating
// object factories in the CORBA namespace and creating the device objects dynamically. Such measures are required
// since the devices lie along the time critical data path.

Segment Playout Operations (Continued from page)
// Operations that occur at PTACW objects
// during segment playout

*Fig. 14*

RescheduleProgram(program, startTime) (Continued on next page)
// Operations that occur at PTACW objects during program
// rescheduling RescheduleProgram(program, startTime) (Continued from previous page)
// Operations that occur at PTACW objects during program
// rescheduling RescheduleProgram(...) (Continued on next page)
// Scheduling operations that occur at PTACW
// objects during program rescheduling RescheduleProgram(...) (Continued from previous page)
// Scheduling operations that occur at PTACW
// objects during program rescheduling

PLAY TO AIR CONTROL WORKSTATION SYSTEM IN A DISTRIBUTED OBJECT TELEVISION BROADCAST STUDIO

BACKGROUND OF THE INVENTION

1. Field of the Invention

This invention relates to television broadcast studios and, more particularly, to play to air control workstation systems in television broadcast studios for controlling and managing television broadcasts.

2. Description of the Relevant Art

The architecture of a typical broadcast studio can be viewed as a complicated web of electronic and mechanical devices connected together by miles of cabling and numerous switches. Because of this complexity, studios exhibit a number of problems that must constantly be addressed. The most apparent and costly of these is that of maintaining the enormous bulk of cabling and switches upon which the studio is built. While this is generally not a problem with smaller studios, it becomes an increasingly more pressing issue as the studio matures. As studios grow and new components are introduced, cabling must be added to connect the new components to the existing studio devices. In most cases, reusing cabling may not be an option since the current studio operations often cannot be interrupted. As the studio matures and the equipment in the studio undergoes enhancement and change, the job of maintaining and managing this ever increasing mass of wiring requires a significant effort. Over time, even determining the function of a given cable can be a difficult task. In addition, the dependence that existing studio devices can have on their particular position in the web can create serious problems when cabling is removed, or when the web topography changes. The end result is that much of the studio technologies that are in use today are both costly and difficult to change. In addition, the deployment of new technologies into a studio requires a great deal of time and effort to ensure that the studio remains in a properly working state.

Another problem with current studio architectures is the physical limitations placed on the equipment in the studio. Since adding new cabling to a studio represents a significant amount of effort and cost, new devices are generally placed where they are easiest to wire. While studios have adapted their current operations to accommodate these constraints, planning for future technologies whose physical requirements are unknown becomes a difficult task. The result is that adoption of new technologies can be slowed significantly because of pressures to conserve valuable studio real estate. In addition, personnel that use or manage the studio devices are generally located where it is most economical to deploy them. Often, this will mean that studio workers must be located within close proximity to the devices they manage. The overall result is that people and equipment tend to be located within the studio where they physically make sense rather than being grouped together where their functions are logically beneficial.

It would accordingly be desirable to provide a system for managing and controlling resources in a broadcast studio which is very flexible to change and highly adaptable to new technologies with a minimum of effort, disruption and cost.

SUMMARY OF THE INVENTION

The problems outlined above are in large part solved by a play to air controller station system in a distributed object television broadcast studio in accordance with the present invention. In one embodiment, a play to air control work station is used to control a variety of resources in a broadcast studio system interconnected by a communications network. The resources of the broadcast studio system include a transmitter unit, various media source devices such as tape decks and file servers, a network routers unit, and various decoders and encoders. The broadcast studio system is managed as a network distributed object system where an all physical devices are attached to the network either by containing appropriate software within themselves, or by attaching themselves to a computer proxy that is on the network and is able to control their functionality. The control system includes one or more device objects configured to store, route and transmit selected video segments to be aired from the television broadcast studio, For example, the device objects may include a tape deck object, a router object, a video server object, an encoder and/or decoder object, and a transmitter object. The device objects generally define common public functionality required by the studio. The control system further includes one or more video playout identification objects which include playout information to identify and specify an order for airing of predetermined video segments. In one specific implementation, the video playout identification objects include a media source object which encapsulates the attributes of a media segment that will be aired and which forms the smallest granularity element of a program segment. A program object is further provided which serves as a container for media source objects. Similarly, a playlist object is created which serves as a container for program objects. An application object which supports user interactions with the play to air control workstation allows for user creation and manipulation of the media source, program, and playlist objects. A playlistDB (database) object, a single instance of which exists in the studio, provides appropriate API's (Application Program Interfaces) for querying and editing playlists in the database. The playlistDB object further manages scheduling tasks that result from playlist editing operations, and creates and manages an update event channel for every playlist in the database for the purpose of keeping all playlist objects in a consistent state. The play to air control work station further comprises one or more control objects configured to receive the playout information according to the playout identification objects and to effectuate transmission of predetermined video segments in accordance with the playout information. In one implementation, the control objects include a system resource manager which generally manages and reserves system resources. The system resource manager further implements admission control and load balancing algorithms for the studio devices, and may provide certain device attributes to querying devices such as device latencies.

A play to air work control workstation for a television broadcast studio in accordance with the present invention may advantageously accommodate flexible control of resources in the broadcast studio. The system is further very flexible to change and is highly adaptable to new technologies with a minimum of effect disruption and cost.

BRIEF DESCRIPTION OF THE DRAWINGS

Other objects and advantages of the invention will become apparent upon reading the following detailed description and upon reference to the accompanying drawings in which:

FIG. 6–21 illustrate various specific command flow and event notification communications between various objects in the play-to-air control workstation.

Figure 1:
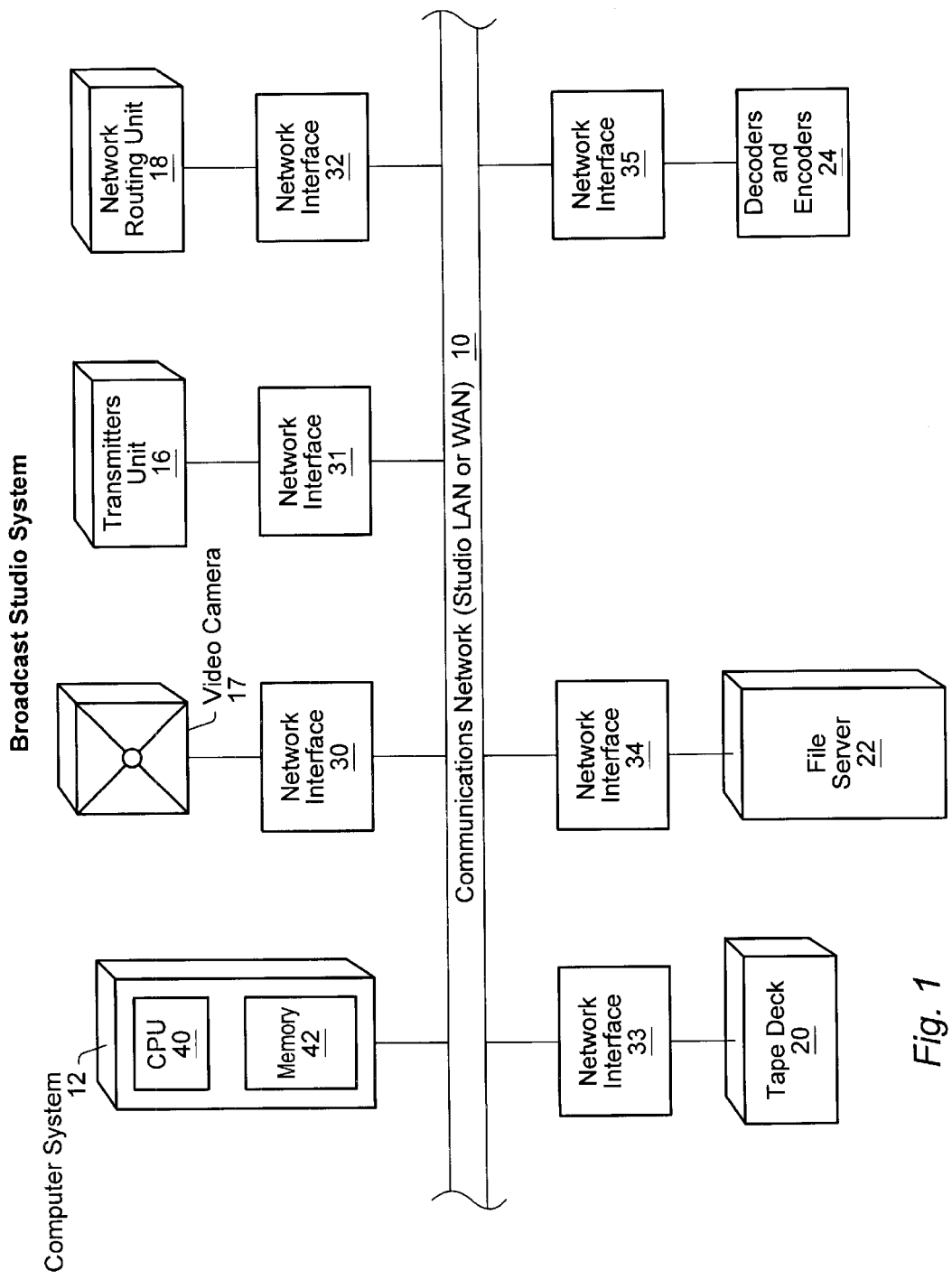
FIG. 1 is a hardware diagram illustrating various components of a broadcast studio system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a hardware diagram illustrating a variety of components of a broadcast studio system interconnected by a communications network 10. The components of the broadcast studio system include a computer system 12, a video camera 14, a transmitter unit 16 and a network routers unit 18. The system further includes a tape deck 20, a file server 22 and various decoders and encoders 24. As illustrated, several of the components are coupled to the communications network 10 through a respective network interface unit 30–35.

Each of the components illustrated in FIG. 1 control or provide a designated function or functions relating to the transmission of television signals from the broadcast studio. For example, taped programming information may be stored by tape deck 20, and similarly, additional programming information may be stored within file server 22. The programming information within tape deck 20 and/or file server 22 may be stored in a compressed format such as an MPEG-2 format. Network routers unit 18 controls the routing of video and audio signals through the broadcast studio such as, for example, the routing of programming information from a particular source to a designated transmission channel of transmitters unit 16. Network routers unit 18 additionally controls the routing of video and audio signals through various system resources such as decoders and encoders 24, as desired. The transmission of the various video and audio signals within the broadcast studio may be supported through the use of various cabling or other interconnecting means (not shown) associated with the broadcast studio.

Decoders and encoders 24 represent various video and/or audio encoding and decoding units to allow, for example, the compression and decompression of information, as desired. It is noted that a variety of industry standard video compression or decompression techniques may be supported and employed, such as MPEG-2 format.

As will be described in further detail below, the broadcast studio system of FIG. 1 is managed as a network distributed object system wherein all physical devices are attached to the network either by containing appropriate software within themselves, or by attaching themselves to a computer "proxy" that is on the network and is able to control their functionality. In each of these cases, a software implementation of the object that controls the device is present on the network and is registered with appropriate information about its nature. Various aspects of this functionality is controlled by computer system 12, which illustratively includes a CPU 40 and memory 42. It is noted that various other physical configurations of a broadcast studio are also possible, and may be provided as desired. For example, fewer or additional network resources may be coupled to communications network 10. Furthermore, software associated with the control of objects defined within the system may be executed by any physical device coupled to the communications network 10, regardless of its physical location on the communications network 10.

Figure 2:
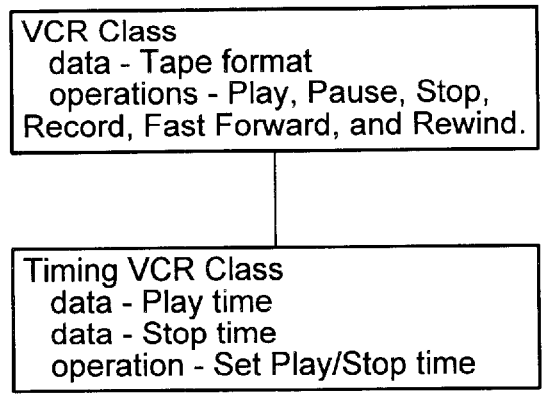
FIG. 2 is a diagram of an exemplary VCR class.

A basic concept associated with a distributed object television broadcast studio is that software services are provided in terms of individual building blocks (classes) that have the ability to perform all of their logical operations on themselves and upon the data they contain. A simple example of this is a VCR class that contains basic information about a tape deck such as the format of the tape it accepts, as illustrated in FIG. 2. In addition, it may also provide several operations that will control the basic functions of the tape deck. Each instance of this class known as an "object" contains its own specific copy of the data. That is, in this case, each instance represents a different physical device. For example, if two tape decks are connected to the network that accept tapes of different types (such as D1 and Beta), two instances of the class VCR are created, one that represents and controls the D1 tape deck, and the other that controls the Beta deck. The notion that objects contain their own data and that operations that can be performed on that data is known as "encapsulation".

Another important attribute of classes is their ability to inherit functionality from other classes. This idea is known as "sub-classing", and can be better understood by considering the exemplary class, the VCR class, of FIG. 2. As described above, instances of this class store information about the specific tape device and provide control of the tape deck's basic functions. The tape format information and the control operations encapsulate all of the "attributes" of the class. As illustrated in FIG. 2, a second class, the "timing VCR class", inherits all of the attributes of the VCR class, but adds an additional bit of functionality that starts and stops the VCR at specific times. In this case, the sub-class does not replicate the attributes of its ancestor, but inherits them. This idea can be extended to create additional sub-classes of the timing VCR class that add yet even more functionality. With each successive sub-class, only the new attributes need to be provided; everything else is inherited from the ancestor classes. In addition to containing static data as part of its attributes, an object may also contain other objects whose functionality they need.

In addition, another feature is a mechanism that allows objects to observe the state changes of other objects. For example, a monitor object may be provided that watches the VCR class so that when the tape starts to play, it automatically turns itself on to display the output. In this case, the monitor will request notification of state change events in the VCR, which in turn broadcasts these events to its observers when the changes take place. It is noted that in such a situation, the VCR object does not need to know anything regarding the objects that are observing it, or even the number of objects interested in its state changes. It simply must broadcast a notification using an event channel which is incorporated within the object system.

Yet a further aspect of object systems is the creation of a "registry" of objects on the network that knows the location and capabilities of all objects in the system. When a client wants to sub-class an existing class, or wants to use an existing object, the registry will provide them the information necessary to access their attributes. If the registry allows objects in classes to be registered with information about their nature, i.e., a "monitor" type or a "tape deck" type, then the presence of an object or class on the system can be queried when needed, and the client need not have any prior knowledge of the specific makeup of the network. Thus, if for example an application desires that an output of a tape deck be provided to all monitors in the studio, the client may retrieve the object controlling the specific VCR to be played, and may request from the registry all of the currently registered objects of type "monitor" to thus instruct the tape deck to output to those devices.

As stated previously, in a studio designed around a network distributed object system, all physical devices are attached to the network either by containing the necessary software within themselves, or by attaching themselves to a computer "proxy" that is on the network and is able to control its functions. In each of these cases, a software implementation of the object that controls the device is present on the network and is registered with appropriate information about its nature. A practical example of this is a tape deck that is attached to a computer through an RS-422 connection, which in turn is attached to a network and implements all of the functions of the "Tape Deck" object. If a client wants to start the tape deck playing, he queries for the specific tape deck object and invokes the Play operation. It is noted that objects are viewed the same way on the network whether they represent real physical devices, or are purely software objects such as a playlist editing application.

Figure 3:
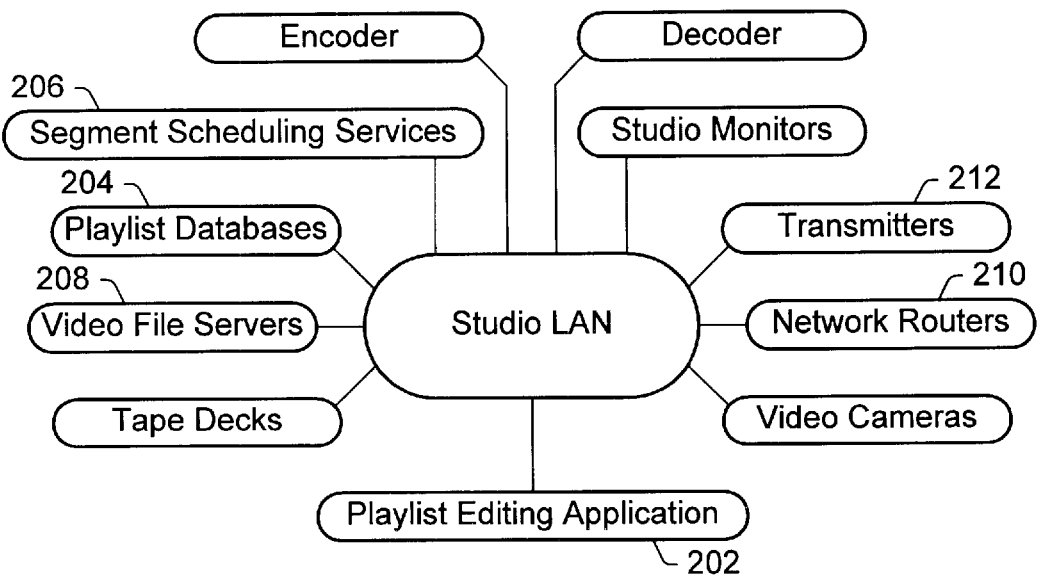
FIG. 3 is a diagram illustrating various functionality associated with the broadcast studio system of FIG. 1.

Turning now to FIG. 3, a diagram is shown which illustrates various functionality associated with the broadcast studio system of FIG. 1. The functionality illustrated by the diagram of FIG. 3 includes a playlist editing application 202 that allows modification of currently scheduled playlists, a playlist database 204 that stores the content information for all of the video segments in the playlists, a segment scheduling service 206 whose task is to ensure that a given video segment is broadcast at the scheduled time, video file servers that stores video segments, and network routers 210 that routes the video and audio signals through designated components to a transmitter 212. Various other functionality is available within the system, including tape decks 214, encoders and decoders 216, studio monitors 218 and video cameras 220, as desired.

In one embodiment, the functionality illustrated by FIG. 3 is supported in the distributed object television broadcast studio through the instantiation of various objects, as detailed in Table 1 as follows:

TABLE I

| | |
|---|---|
| App: | This is the PTACW (Play To Air Control Workstation) application object. All user interactions with the PTACW application are handled by this object. |
| Studio: | This is the studio object. The Studio object handles event notifications about reservation failures and state changes of scheduled media segments and forwards these to the App object. The Studio object also provides the high level API's for Playlist, Program and MediaSource management. This object is created by the App object and each instance of an App in the studio contains exactly one instance of Studio. |

TABLE I-continued

| | |
|---|---|
| Factory: | This is the object factory for the studio objects. All PTACW objects are created by their respective object factories, these object factories in turn are polymorphically derived from the Factory object. Factory is thus an abstract base class and contains the ( . . . ) method. |
| Playlist: | This is the Playlist object. This object encapsulates all the functionalities required of a Playlist in the studio environment. This object is created by the Studio object. A Playlist corresponds to a Playlist in the Playlist in the database. A Studio therefore contains exactly one Playlist for every Playlist in the database. Updates performed to a Playlist in the database by an instance of a Playlist are communicated to all other Playlist objects in the studio that correspond to that Playlist through the event service. Every Playlist registers itself as a consumer of the persistent event channel for the corresponding Playlist in the database. There are as many database update event channels as there are Playlists in the database, the PlaylistDB object dynamically creates and manages these event channels. This notification mechanism maintains consistency across all instances of Playlist for a Playlist in the database. |
| Program: | This is the Program object. This object encapsulates all the functionalities required of a program in the studio environment. This object is created by the Playlist object. |
| MediaSource: | This is the MediaSource object. This object encapsulates the attributes of a media segment that will be aired. A media segment is aired as a continuous stream and forms the smallest granularity element of a program. A media segment may map to a complete stored data element (e.g. a file) or to a time interval within that data element. The address of a media segment is uniquely defined by the MediaSource attributes. Thus, a Program consists of a list of MediaSource objects. A program in the database in turn contains media segment attributes. |
| PlayoutController: | This is the PlayoutController object. A single instance of this object exits within a studio. The PlayoutController provides the API's for scheduling tasks, for querying the states of scheduled media segments and for control of playout to the various destinations. |
| PlaylistDB: | This is the PlaylistDB object. A single instance of this object exists within a studio. The PlaylistDb provides the API's for querying and editing playlists in the database. It also manages scheduling tasks that result from playlist editing operations. The PlaylistDB creates and manages an update event channel for every playlist in the database for the purpose of keeping all playlist objects in a consistent state. |
| EventService: | This is the COBRA event service. This service is used to create event channels for asynchronous communications across the various PTACW objects. |
| NamingService: | This is the COBRA naming service. This service is used to locate the various PTACW objects that are registered with the interface repository. |
| Scheduler: | This is the Scheduler object. This object carries out the tasks related to scheduling media segments for airing. |
| ScheduleTable: | This is the ScheduleTable object, a single instance of this object exists in the studio. The object maintains and manages the schedule table. The schedule table contains |

TABLE I-continued

| | |
|---|---|
| Player: | the list of all media segments scheduled for air.<br>This is the Player object, a single instance of this object exists in the studio. This object performs the task of reading the schedule table periodically and servicing any schedules that become active. This object also encapsulates all the functionality required to keep track of reservations status changes of any of the scheduled media segments. It sends notifications of status changes to all Studio objects. |
| Connector: | This is the connector object. This object carries out all the tasks associated with servicing an active schedule. This includes finding the data path, creating/acquiring device objects along the data path and creating and managing streams. |
| Stream: | This is the Stream object. This object encapsulates all the functionality associated with stream playout. This object is created by a device object. |
| DeviceResourceManager: | This is the DeviceResourceManager object. A single instance of this object exists within the studio. This object encapsulates all the tasks related to managing device resources within the studio. It keeps track of device status and available resources on each device. It implements admission control and load balancing algorithms for the studio devices. It also provides services to query device latencies and other relevant device attributes. |
| NetworkResourceManager: | This is the NetworkResourceManager object, a single instance of this object exists within the studio. This object encapsulates all the tasks related to managing network resources within the studio. It keeps track of network status and available resources and allocates resource on request. |
| PTAS-1 . . . PTAS-N, . . .: (Device) | These are the device objects in the studio for the various studio devices. The objects derive polymorphically from a Device object that defines the common public functionality required from studio devices. |
| LibraryService: | This is the LibraryService object. This object encapsulates the functionality of maintaining an index of all source media segments that exist in the studio. |
| Clock: | This is the Clock object. This object encapsulates the functionality of maintaining the time locally in synch with the studio wide NTP time server. |

An exemplary operation associated with the object system of FIG. 3 is to change a commercial segment in a currently airing playlist. Generally considered, the flow of network operations to achieve this operation is as follows: the playlist editing application 202 connects to the network, finds the playlist database object 204, queries for the playlist contents, and displays a graphic showing the playlist. Through the application's user interface, the user swaps out a commercial that is set to air at a later time with a different one.

The playlist editing application 202 invokes the operation in the playlist database object 204 to make the appropriate change. Upon detecting the change, the playlist database object 204 finds the segment scheduling service object 206 and instructs it to ready the new commercial for air. The segment scheduling service 206 then finds the video file server object 208 and requests that it compute the time it will take to ready the new commercial for air. If enough time is available, it sets a timer which when triggered causes the service to create a connection between the video server and the router, and instructs the server to send the commercial's video data. The router object 210 then sends it to the transmitter object 212 and the broadcast is accomplished. This example illustrates how components in the studio interact with each other to accomplish a specific task. It is noted that many of these kinds of operations may occur simultaneously to handle all of the studio's functions.

Figure 4:
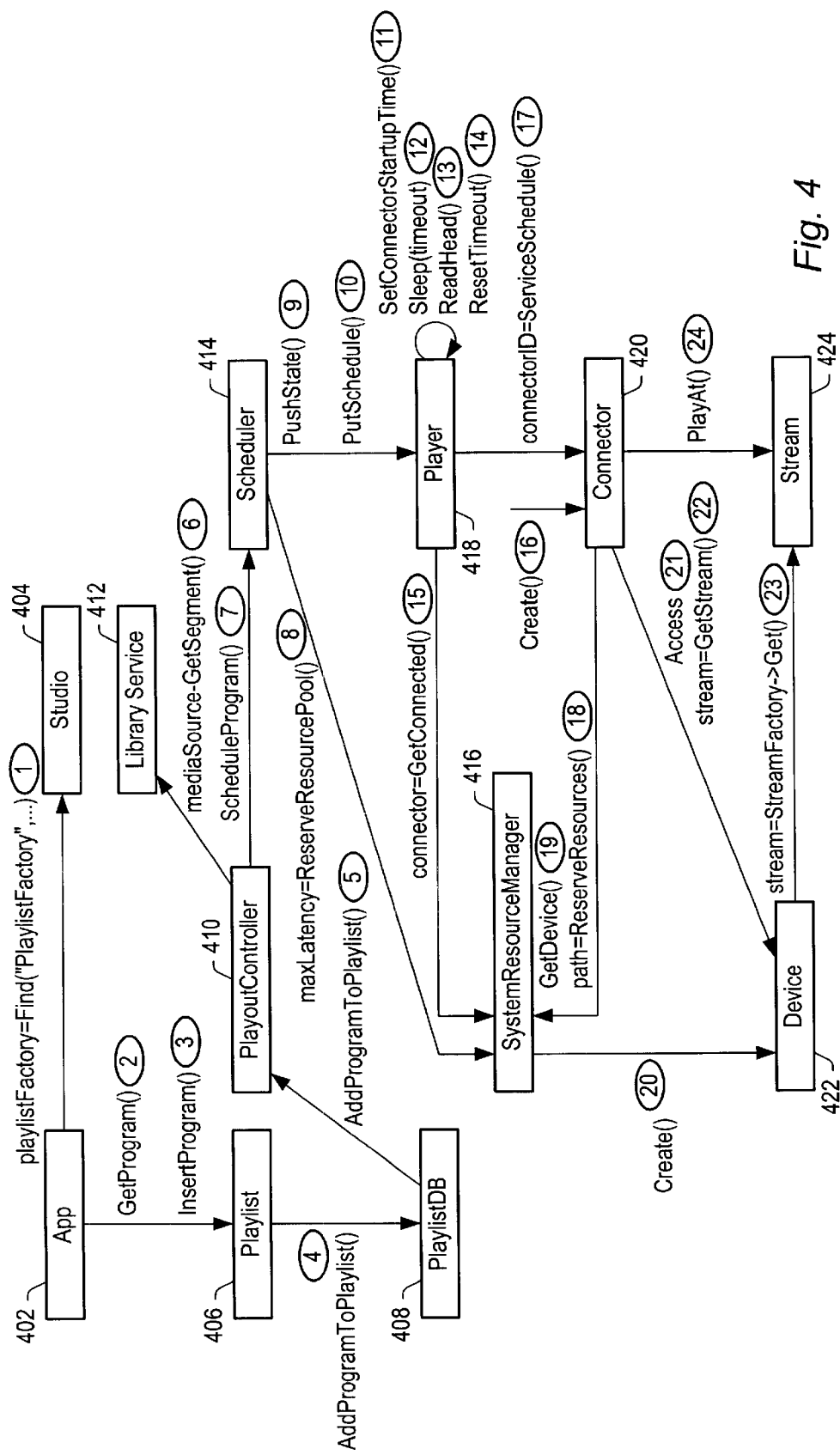
FIG. 4 is a command flow diagram illustrating an exemplary operation in a play-to-air control workstation.
Figure 5:
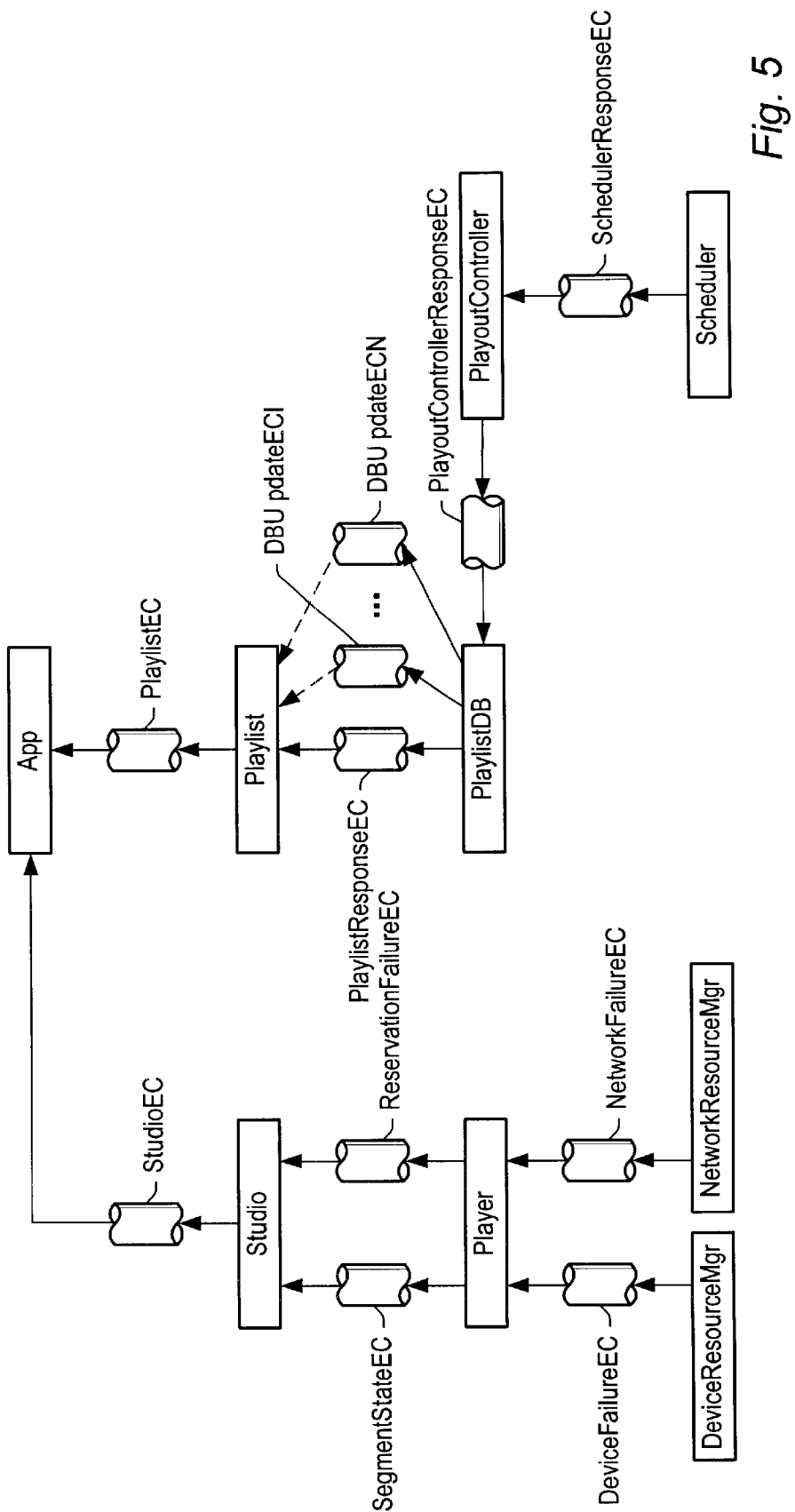
FIG. 5 is a diagram illustrating various event channels formed between objects in the play-to-air control workstation.
Figure 6:
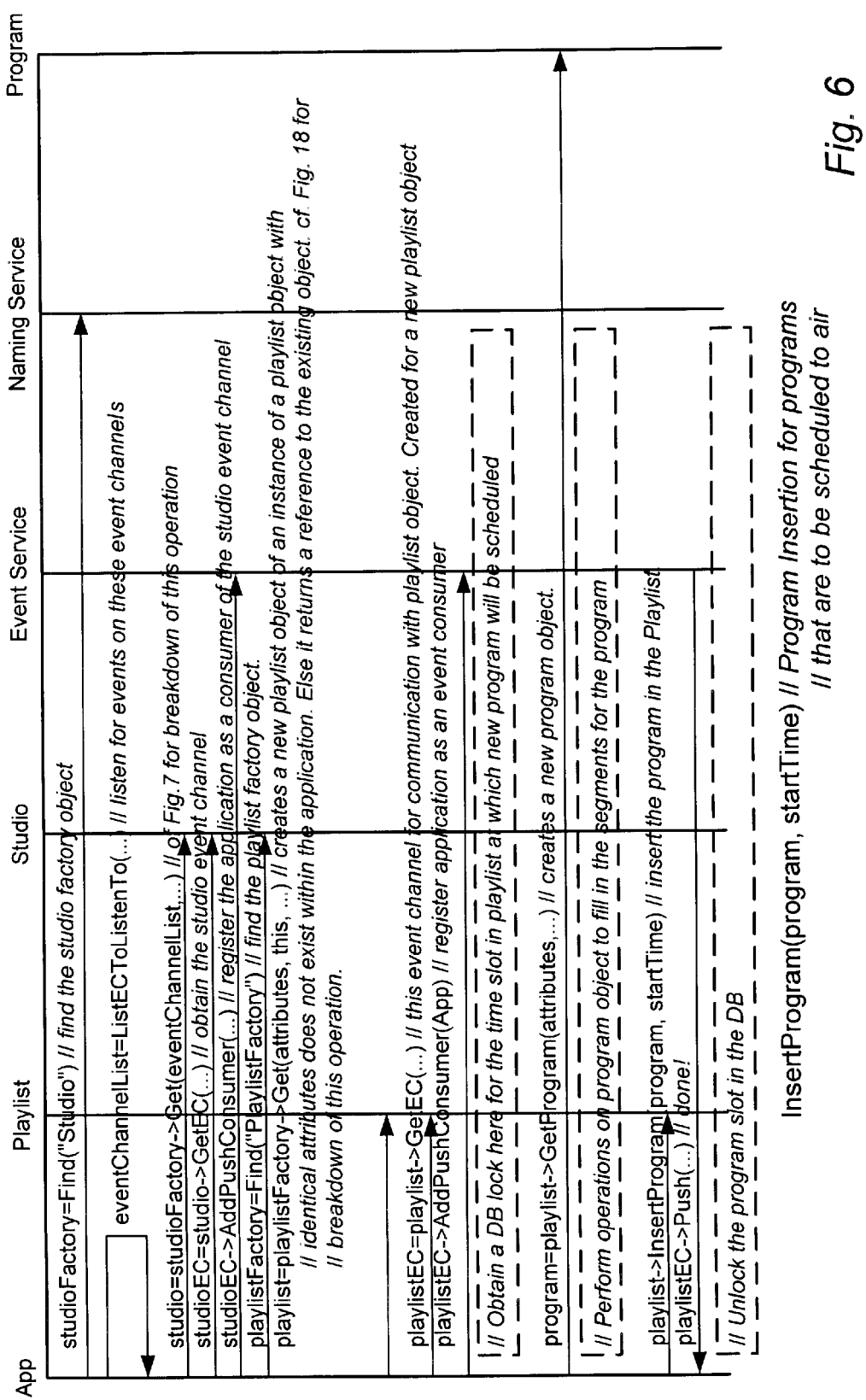
Figure 7:
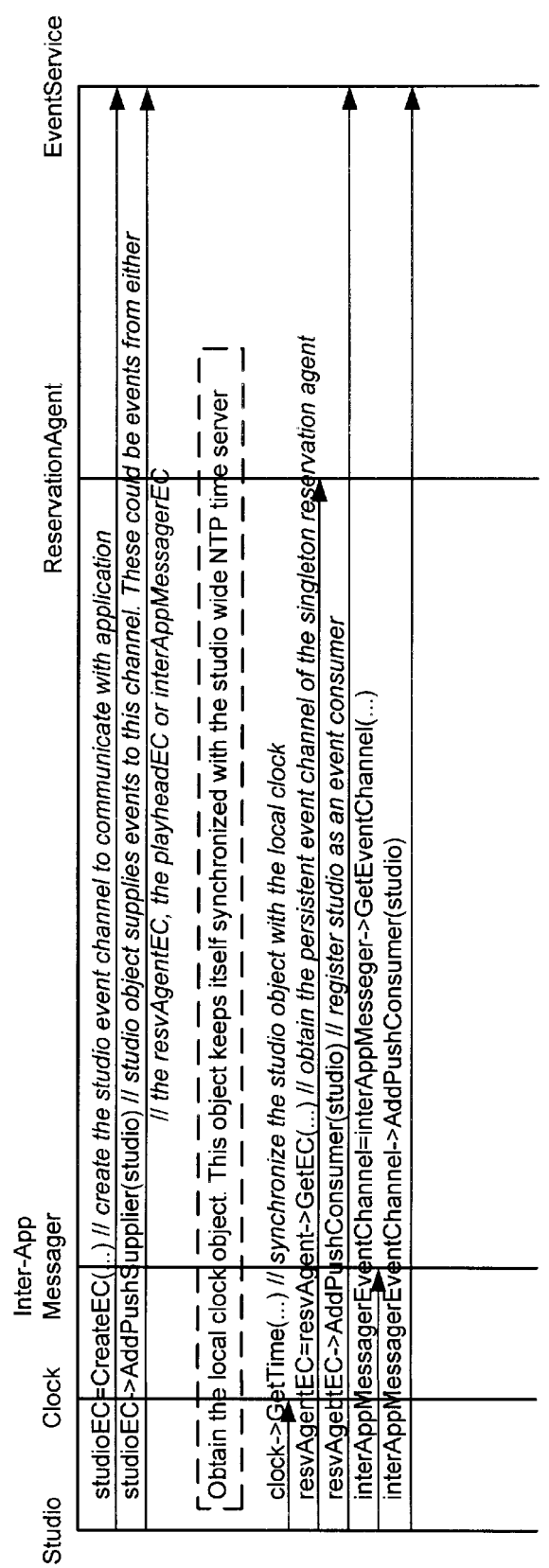
Figure 9:
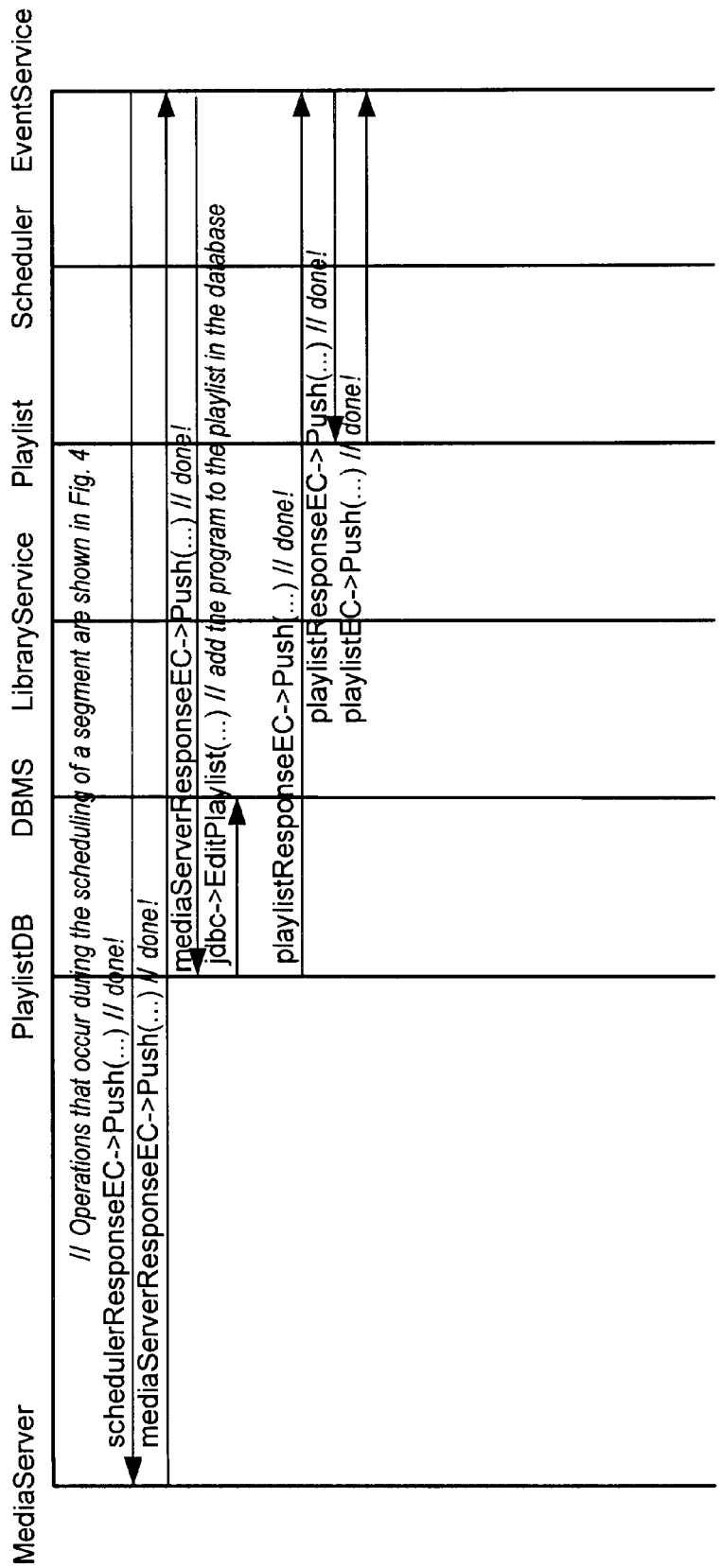

Turning next to FIG. 4, a command flow diagram is shown of an exemplary operation in the play to air control workstation depicted generally in FIG. 3. The operation depicted in FIG. 4 is an operation to allow a program to be inserted within a designated Playlist. FIG. 5 is a diagram illustrating various event channels which may be formed between objects in the play to air control workstation. Finally, FIGS. 6–21 illustrate various specific command flow and event notification communications between various objects in the play to air control workstation.

Referring first collectively to FIGS. 4–9, the application object 402 queries the Studio object 404 to obtain a reference to the existing object corresponding to the Playlist in which a new program is to be inserted. The Studio object 404 creates a new Playlist object if an instance of a Playlist object with identical attributes does not already exist within the application. Application object 402 subsequently inserts the program into the designated Playlist object 406, and the PlaylistDB object 408 is updated.

The PlayoutController object 410 is then notified by the PlaylistDB object 408 to perform various tasks in response to the insertion of the program. Specifically, PlayoutController 410 queries library service 412 to find the media source corresponding to the inserted program. The Playout-Controller object 410 further creates a Scheduler object 414 corresponding to the new program to thereby schedule each of the segments in the program.

Figure 10:
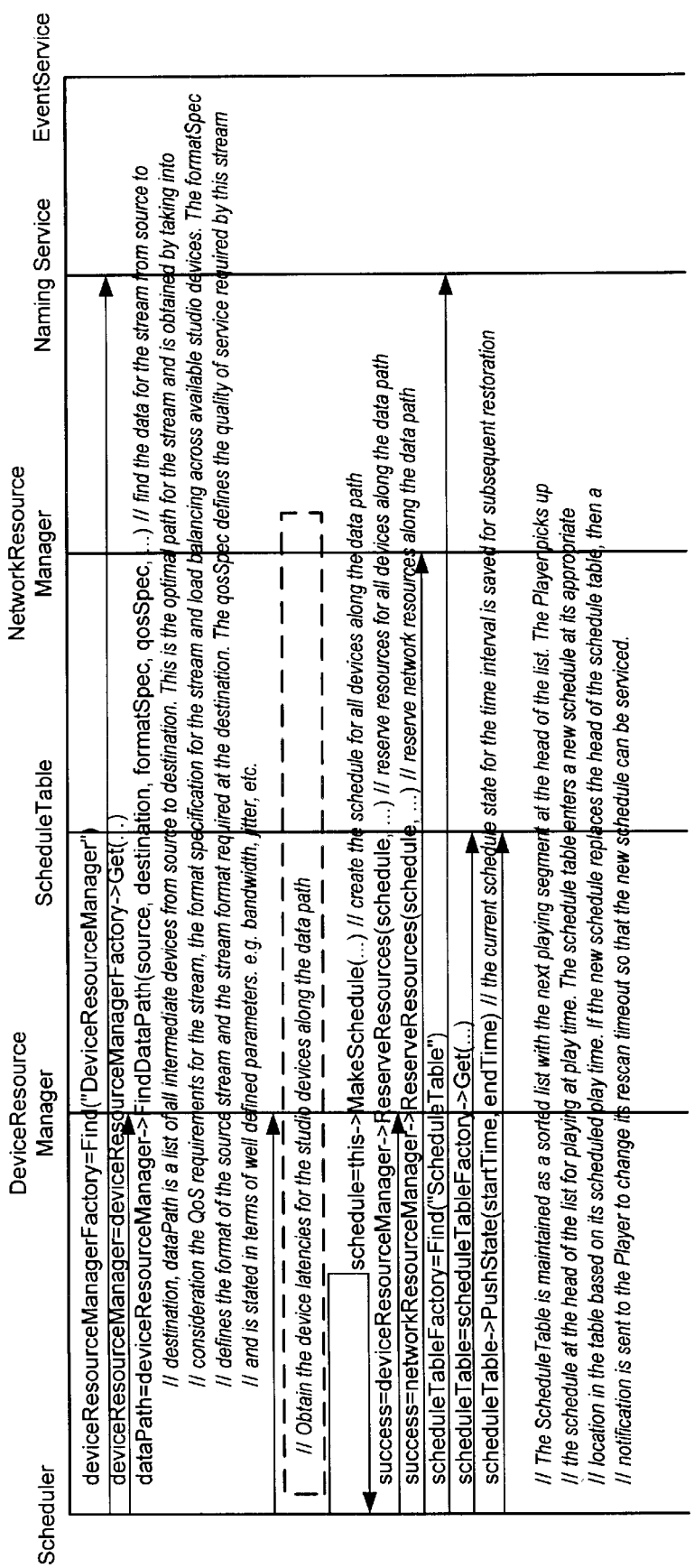
Figure 11:
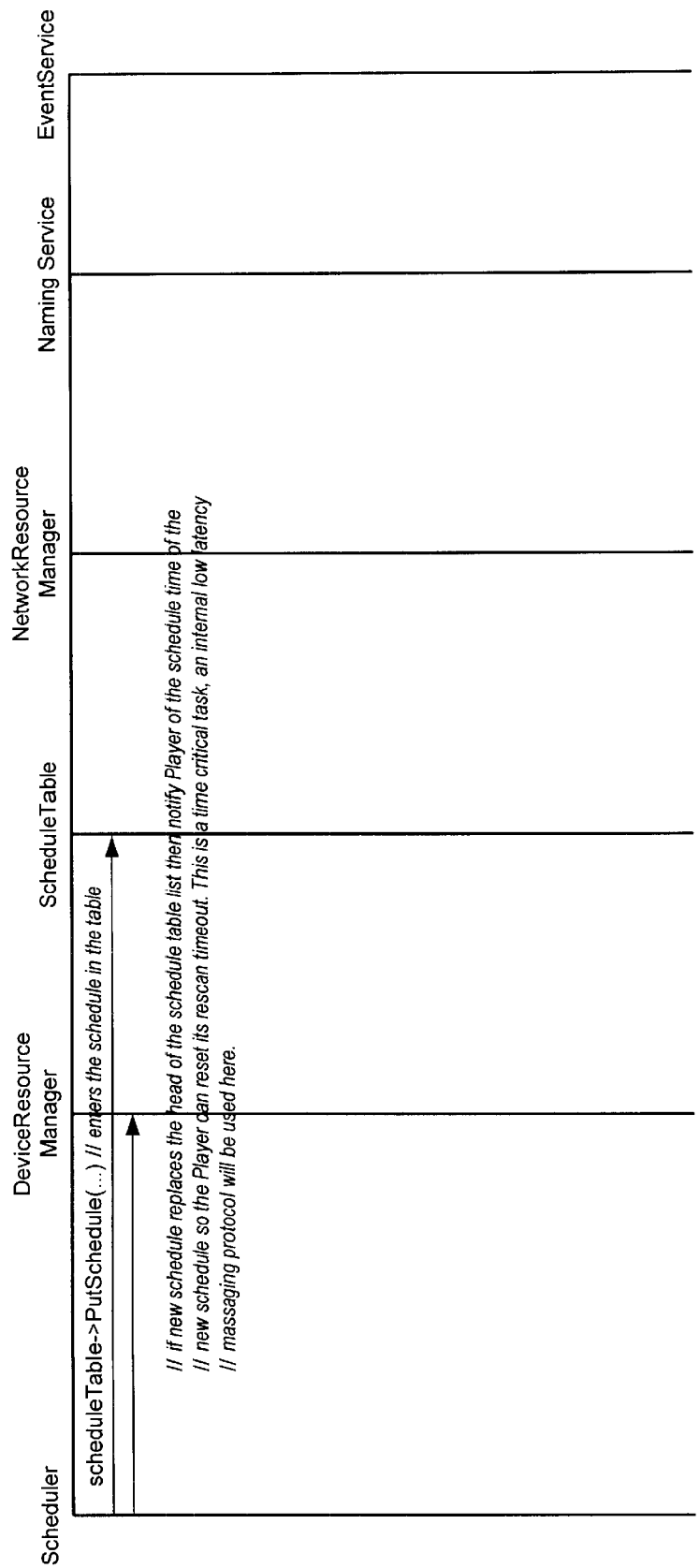
Figure 12:
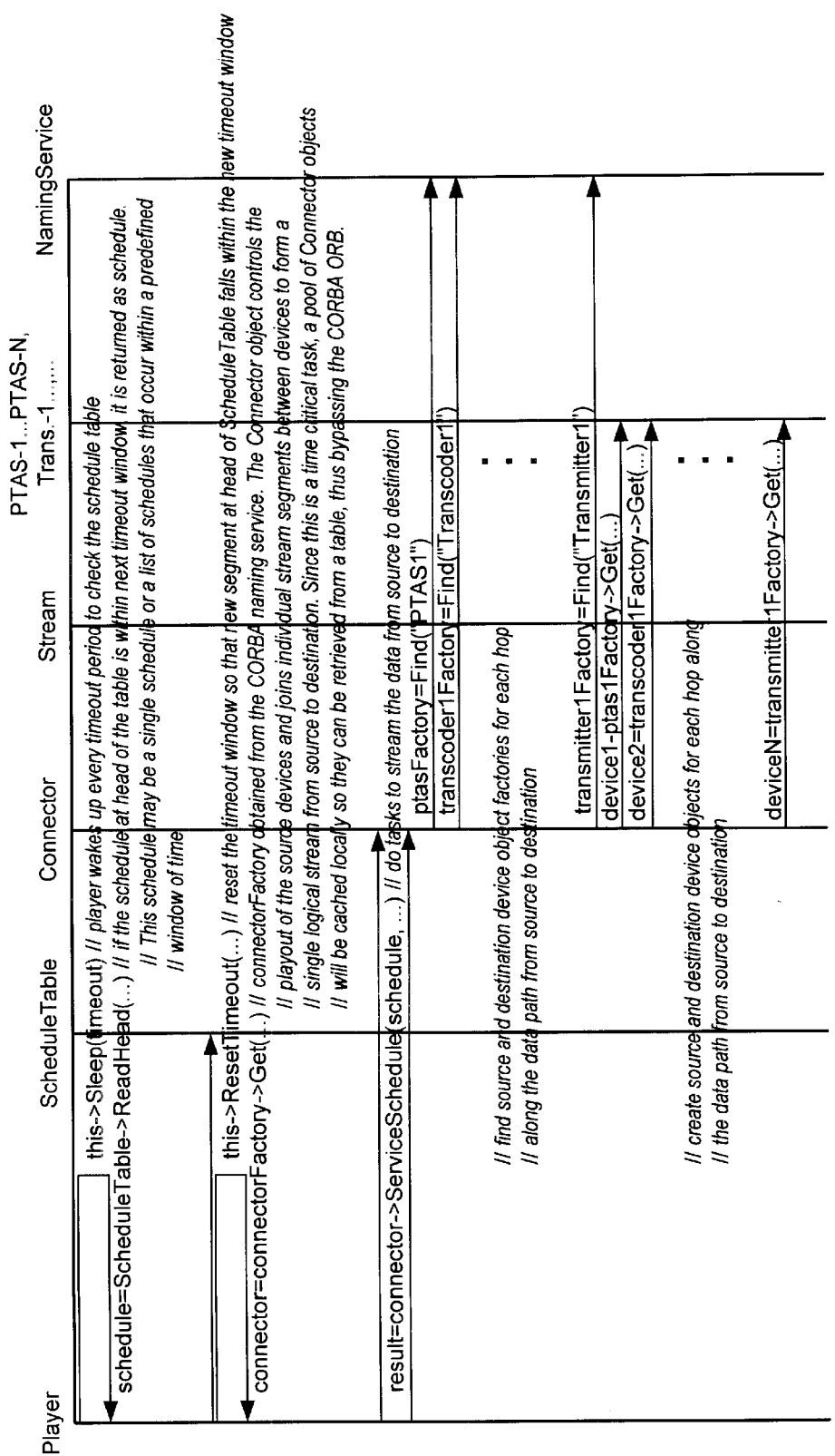
Figure 15:
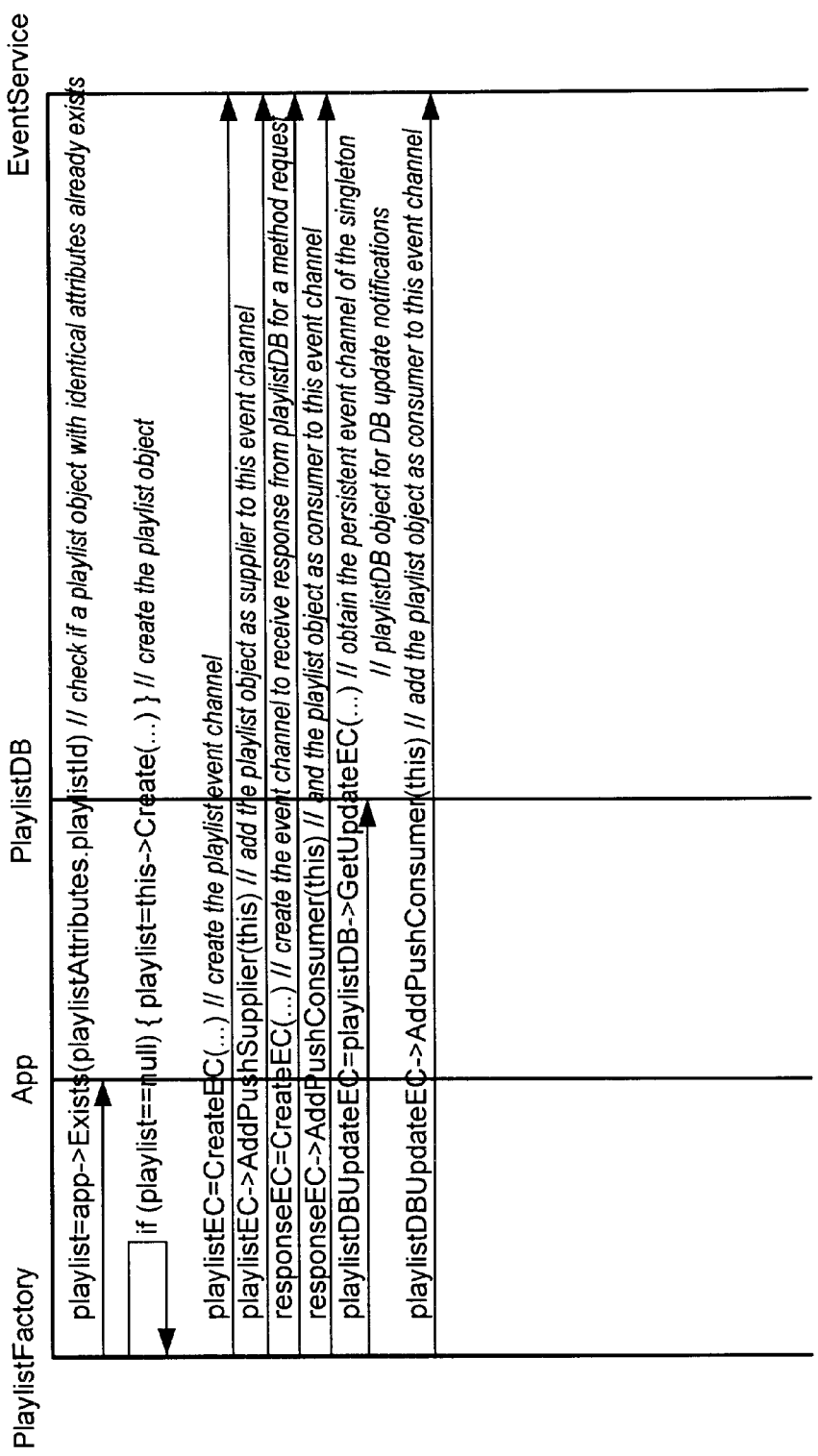
Figure 16:
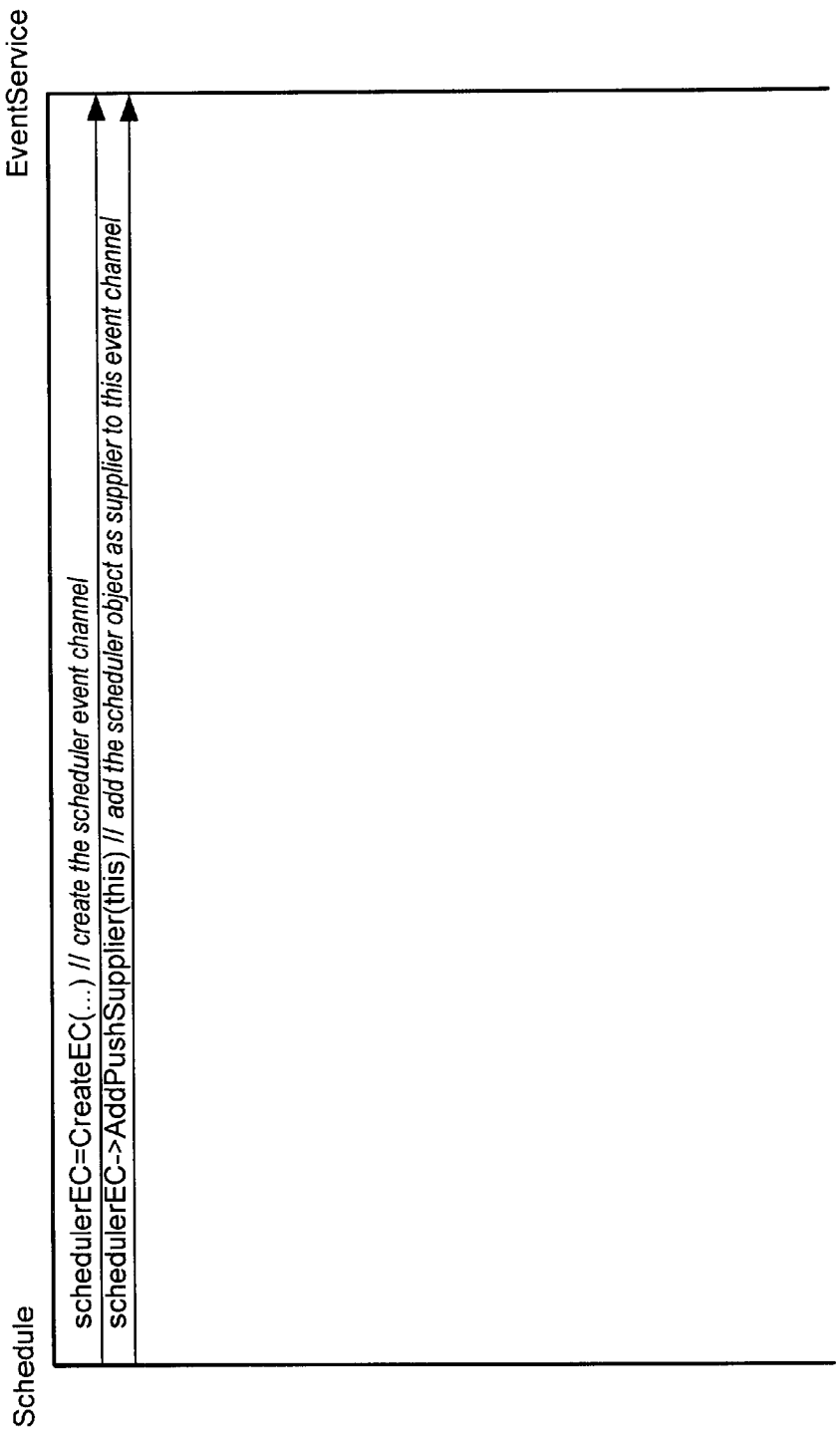
Figure 17:
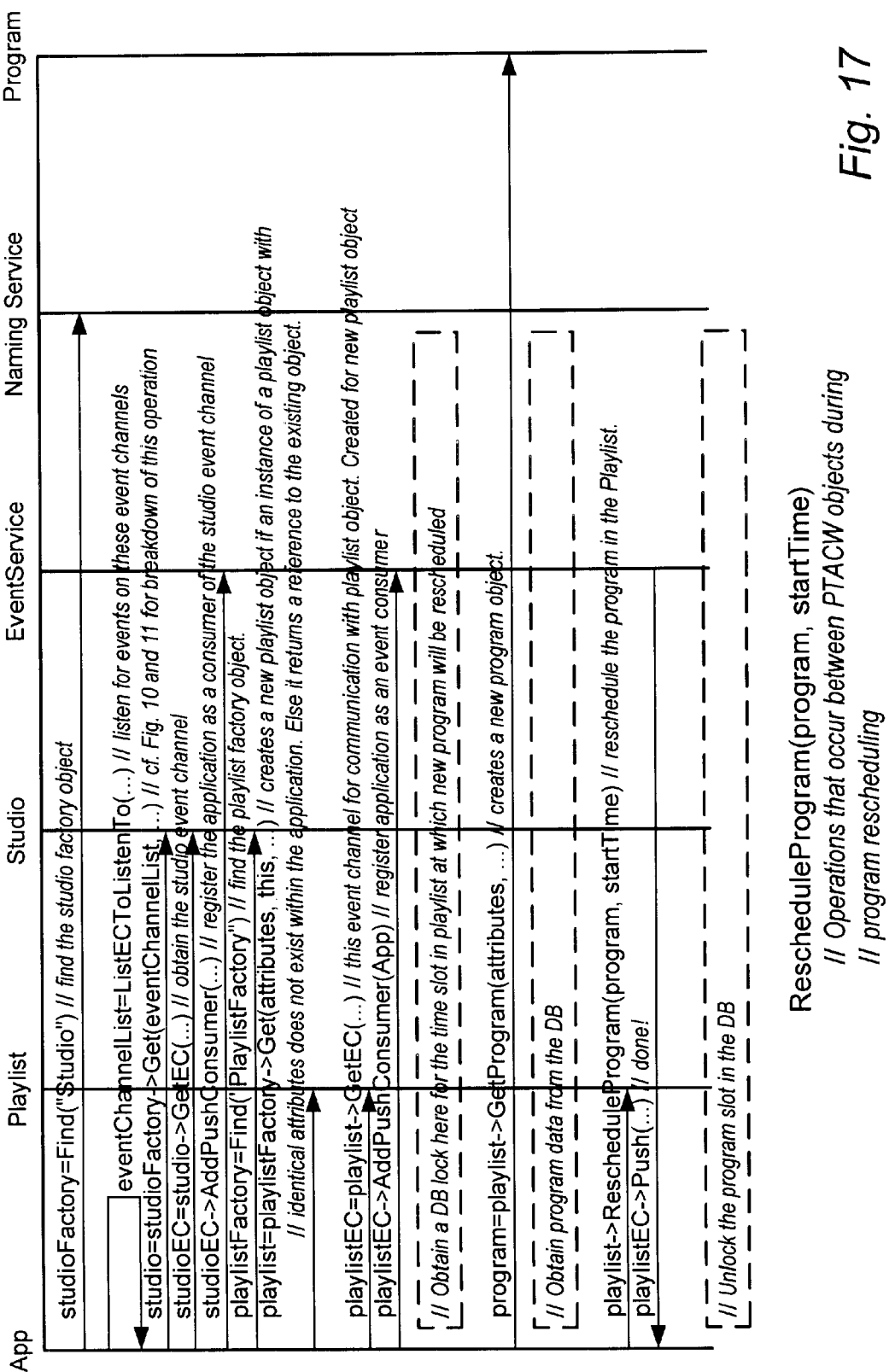
Figure 18:
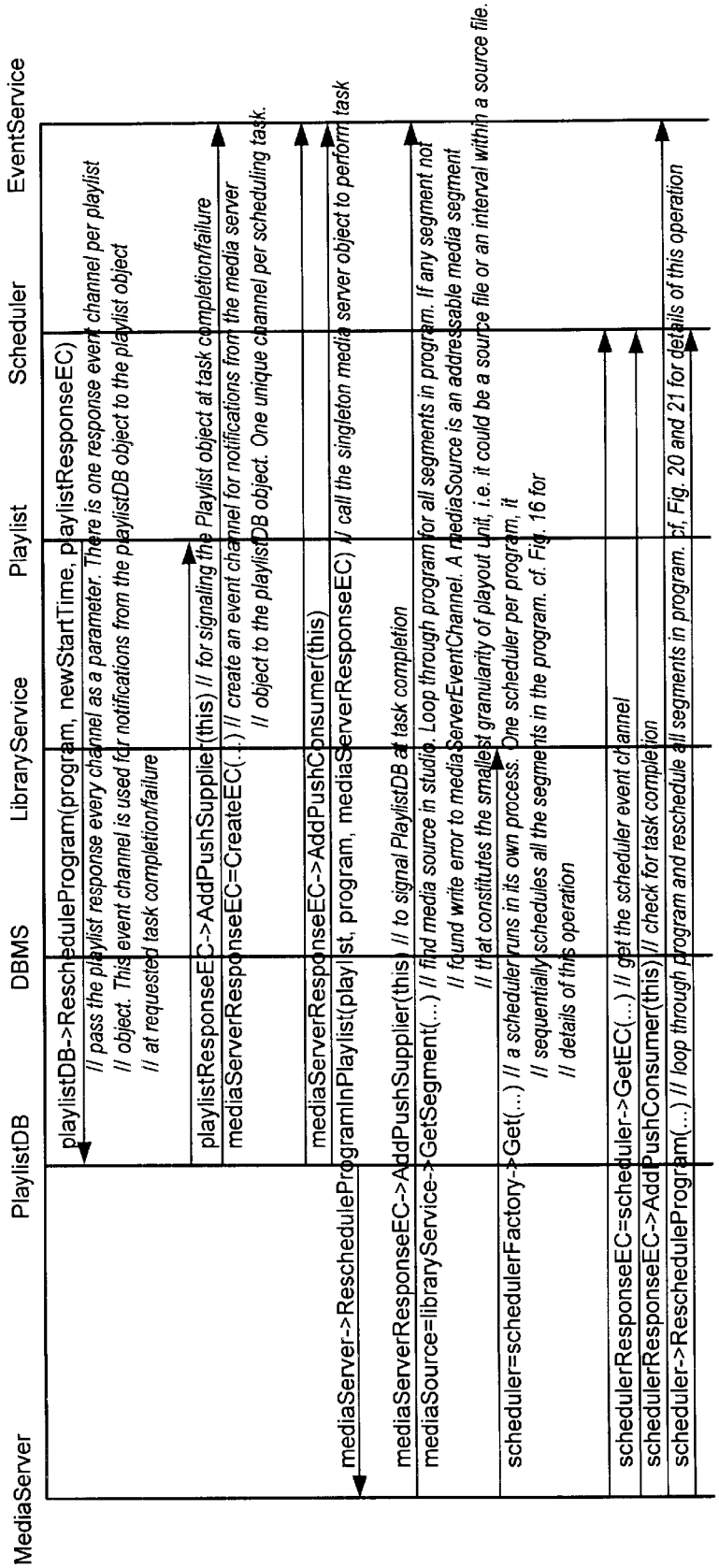
Figure 19:
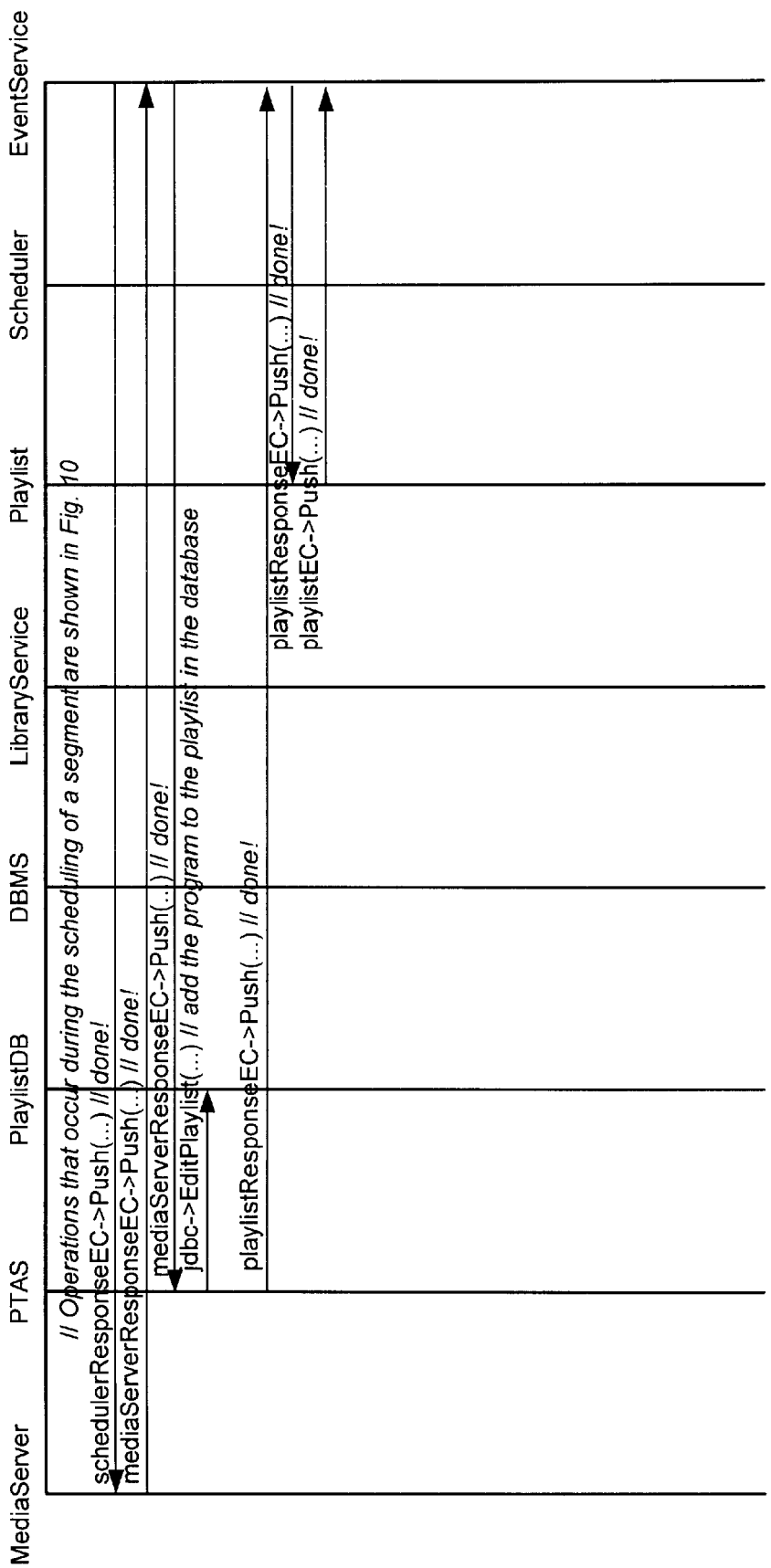
Figure 20:
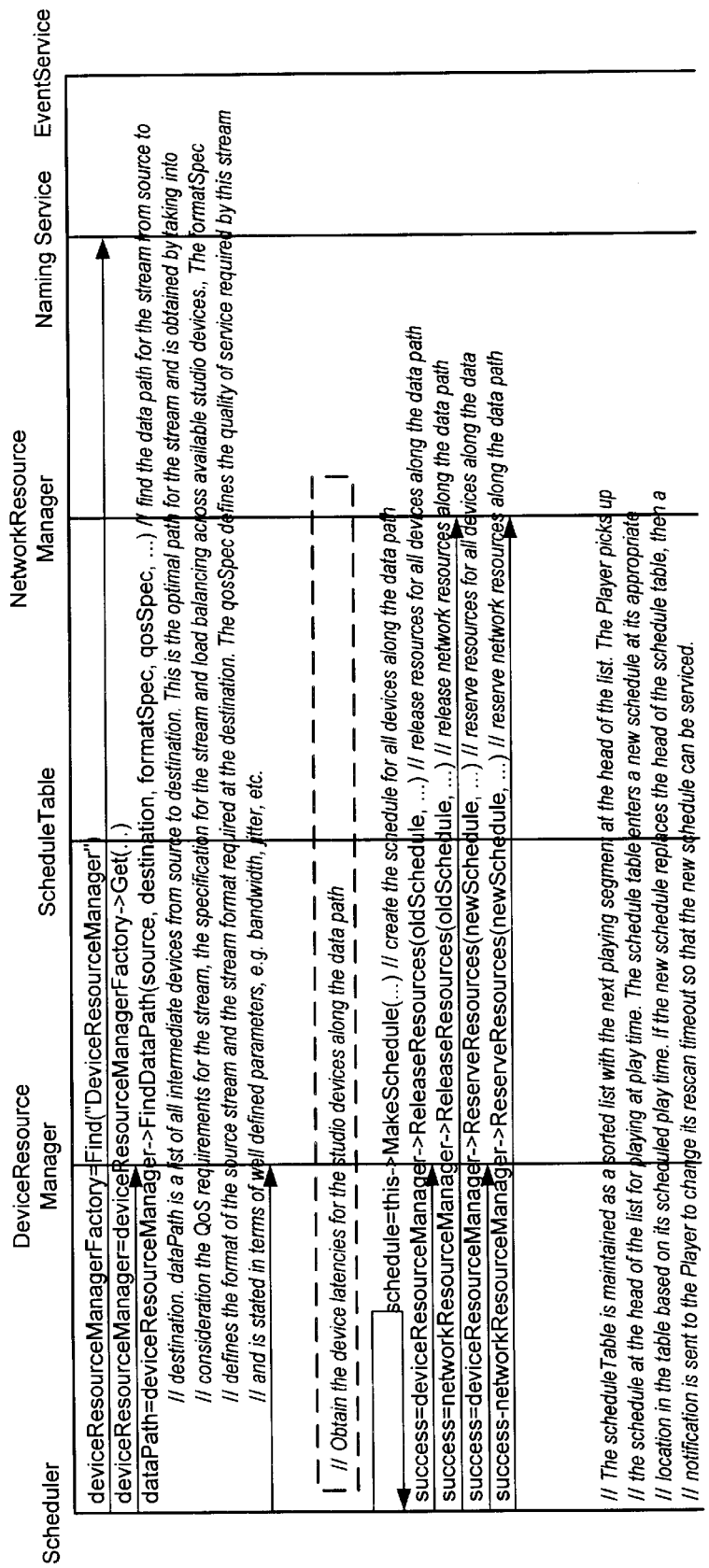
Figure 21:
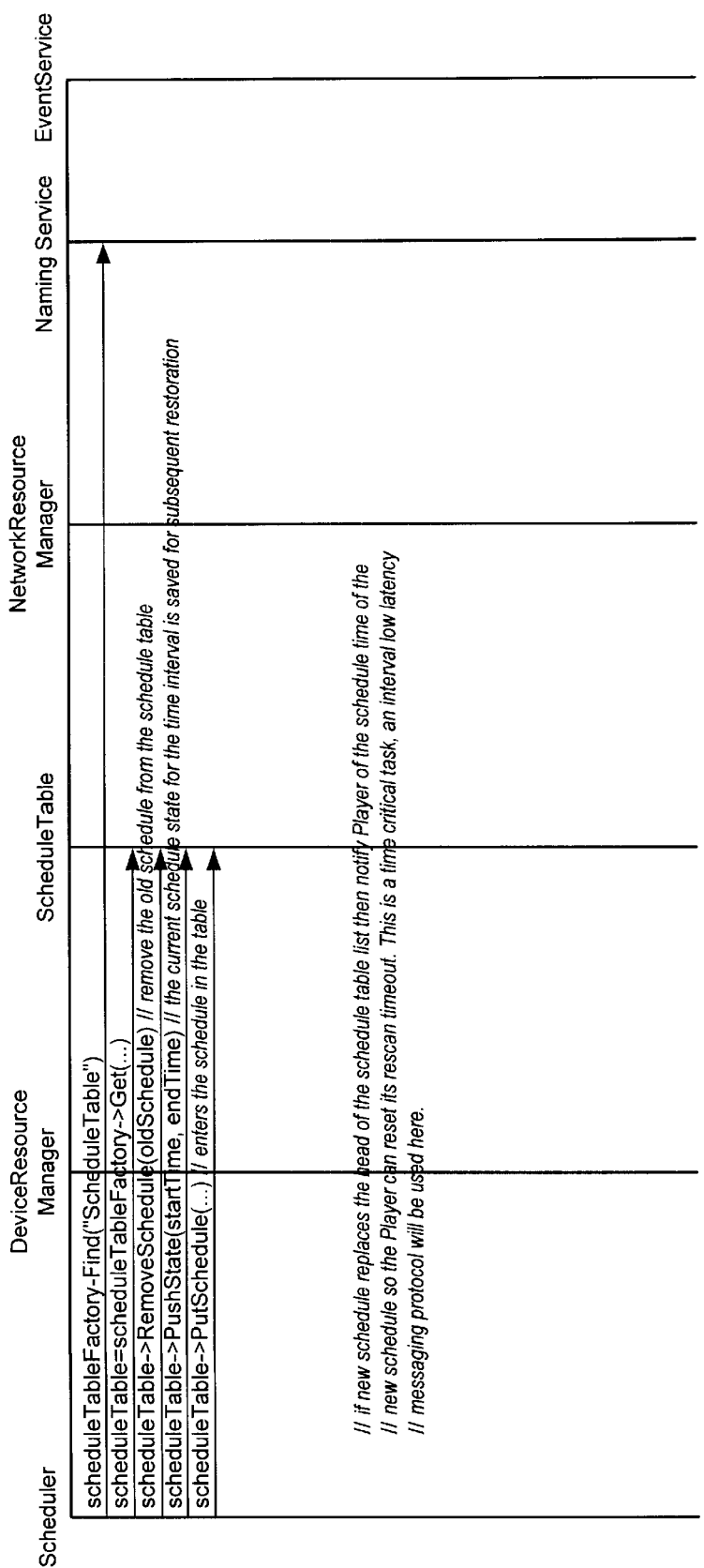

FIGS. 10 and 11 illustrate various operations invoked by Scheduler object 414. Specifically, Scheduler object 414 requests the reservation of required network resources along the data path, which is performed by SystemResourceManager object 416. The SchedulerTable object then enters the new schedule at its appropriate location in the table based on its scheduled playtime. Player object 418 performs the task of reading the schedule table periodically to service any schedules that become active. When a particular schedule becomes active, the Player object 418 causes connector object 420 to find the data path and to create or acquire the required device objects along the data path. Connector object 420 further creates and manages the required stream objects. Thus, connector object 420 passes command information to both the Device object 422 as well as the Stream object 424.

It is noted that time critical paths as illustrated in FIG. 4 are represented with solid line arrow connectors, while non-time critical paths are illustrated with dashed line connector arrows. In one implementation, non-real time path objects are implemented in Java, while real time path objects are implemented in C++. Furthermore, in one implementation all objects have COBRA IDL compliant interfaces. The PlayoutController, PlaylistDB, Player and SystemResourceManager objects are single instance in the studio.

It is noted that there is one SchedulerEC (event channel) per Scheduler, one PlayoutControllerResponseEC for every Playlist in the database, one PlaylistResponseEC per Playlist, and one PlaylistEC per Playlist. Furthermore, there is one DBUpdateEC per Playlist in the database, one DeviceFailureEC in the studio, one NetworkFailureEC in the studio, one SegmentStateEC in the studio, one ReservationFailureEC in the studio, and one StudioEC per Studio.

These event channels are used to invoke methods on other objects, to get or set attributes of other objects, or to generate or handle various events, as depicted in FIGS. 6–21, for example.

Numerous variations and modifications will become apparent to those skilled in the art once the above disclosure is filly appreciated. It is intended that the following claims be interpreted to embrace all such variations and modifications.

What is claimed is:

1. A control system for controlling one or more devices in a television broadcast studio, said control system executable by one or more processors and stored in a memory of said television broadcast studio, said control system comprising:
   one or more device objects stored in said memory and configured to source, route and transmit video segments associated with said television broadcast studio;
   one or more video playout identification objects stored in said memory, wherein said one or more video playout identification objects include playout information which identifies and specifies an order for airing of predetermined video segments; and
   one or more control objects stored in said memory configured to receive said playout information from said one or more video playout identification objects and configured to provide control information to said one or more device objects to effectuate transmission of said predetermined video segments in accordance with said playout information.

2. The control system as recited in claim 1 wherein said one or more device objects include a transmitter object configured to transmit selected video segments associated with said television broadcast studio.

3. The control system as recited in claim 2 wherein said one or more device objects include a tape deck object for storing particular video segments.

4. The control system as recited in claim 2 wherein said one or more device objects include a video server for storing particular video segments.

5. The control system as recited in claim 1 further comprising an application object configured to provide a user interface to allow a user to provide and edit said playout information included with said one or more video playout identification objects.

6. The control system as recited in claim 1 wherein said one or more device objects include a network router object configured to control a transmission path through said television broadcast studio between a video source and a video transmission device.

7. The control system as recited in claim 1 wherein said one or more video playout identification objects includes at least one media source object stored in said memory wherein said media source object identifies a media segment to be aired.

8. The control system as recited in claim 7 wherein said one or more video playout identification objects further includes a program object stored in said memory, wherein said program object is configured to contain said at least one media source object.

9. The control system as recited in claim 8 wherein said one or more video playout identification objects further includes at least one playlist object stored in said memory, wherein said at least one playlist object is configured to contain said at least one program objects.

10. The control system as recited in claim 1 wherein said one or more control objects includes a playout controller object configured to control said transmission of said predetermined video segments in accordance with said playout information.

11. The control system as recited in claim 10 wherein said one or more control objects further includes one or more scheduler objects, wherein said one or more scheduler objects are created by said playout controller object and are configured to schedule designated media segments for airing.

12. The control system as recited in claim 11 wherein said one or more control objects further include a player object responsive to said one or more scheduler objects, wherein said player object is configured to service active scheduler objects.

13. The control system as recited in claim 12 wherein said one or more control objects further include a connector object stored in said memory, wherein said connector object is responsive to said one or more scheduler objects and is configured to manage a data path associated with servicing an active schedule.

14. The control system as recited in claim 1 further comprising a system resource manager object configured to reserve required system resources in response to said playout information specified by said one or more video playout identification objects.

15. A control system for controlling one or more devices in a television broadcast studio comprising:
    a computer system including a central processing unit and a memory, wherein said computer system is coupled to a communications network;
    a plurality of network resources coupled to said communications network, wherein each of said plurality of network resources controls a predetermined functionality associated with said broadcast system;
    a plurality of resources classes stored in the memory of said computer system for creation of network objects, wherein said plurality of resource classes specify attributes associated with said plurality of network resources; and
    a plurality of network objects stored in the memory of said computer system for controlling functionality of said plurality of network resources, wherein each of said plurality of network objects inherits attributes defined by one of said plurality of resource classes, and wherein said plurality of network objects including:
      one or more device objects configured to source, route and transmit video segments associated with said television broadcast studio;
      one or more video playout objects including playout information which identifies and specifies an order for airing of predetermined video segments; and
      one or more control objects configured to receive said playout information from said one or more video playout identification objects and configured to provide control information to said one or more device objects to effectuate transmission of aid predetermined video segments in accordance with said playout information.

16. The control system as recited in claim 15 wherein said one or more device objects include a transmitter object configured to transmit selected video segments associated with said television broadcast studio.

17. The control system as recited in claim 16 wherein said one or more device objects include a tape deck object for storing particular video segments.

18. The control system as recited in claim 16 wherein said one or more device objects include a video server for storing particular video segments.

19. The control system as recited in claim 15 further comprising an application object configured to provide a user interface to allow a user to provide and edit said playout information included with said one or more video playout identification objects.

20. The control system as recited in claim 15 wherein said one or more device objects include a network router object configured to control a transmission path through said television broadcast studio between a video source and a video transmission device.

21. The control system as recited in claim 15 wherein said one or more video playout identification objects includes at least one media source object stored in said memory wherein said media source object identifies a media segment to be aired.

22. The control system as recited in claim 21 wherein said one or more video playout identification objects further includes a program object stored in said memory, wherein said program object is configured to contain said at least one media source object.

23. The control system as recited in claim 22 wherein said one or more video playout identification objects further includes at least one playlist object stored in said memory, wherein said at least one playlist object is configured to contain said at least one program objects.

24. The control system as recited in claim 15 wherein said one or more control objects includes a playout controller object configured to control said transmission of said predetermined video segments in accordance with said playout information.

25. The control system as recited in claim 24 wherein said one or more control objects further includes one or more scheduler objects, wherein said one or more scheduler objects are created by said playout controller object and are configured to schedule designated media segments for airing.

26. The control system as recited in claim 25 wherein said one or more control objects further include a player object responsive to said one or more scheduler objects, wherein said player object is configured to service active scheduler objects.

27. The control system as recited in claim 26 wherein said one or more control objects further include a connector object stored in said memory, wherein said connector object is responsive to said one or more scheduler objects and is configured to manage a data path associated with servicing an active schedule.

28. The control system as recited in claim 15 further comprising a system resource manager object configured to reserve required system resources in response to said playout information specified by said one or more video playout identification objects.

* * * * *